(12) United States Patent
Shimoda et al.

(10) Patent No.: US 7,715,040 B2
(45) Date of Patent: May 11, 2010

(54) IMAGE PROCESSING APPARATUS AND IMAGE PROCESSING METHOD FOR PROCESSING UNNECESSARY DATA STORED IN STORAGE DEVICE

(75) Inventors: Koichi Shimoda, Mishima (JP); Masaru Koga, Mishima (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 1269 days.

(21) Appl. No.: 11/231,033

(22) Filed: Sep. 19, 2005

(65) Prior Publication Data
US 2006/0152751 A1    Jul. 13, 2006

(30) Foreign Application Priority Data
Jan. 11, 2005    (JP) .............................. 2005-003546

(51) Int. Cl.
*G06K 15/00* (2006.01)
*G06F 3/12* (2006.01)

(52) U.S. Cl. ..................................... 358/1.16; 358/1.14

(58) Field of Classification Search .................. 358/1.1, 358/1.8, 1.9, 1.13, 1.15, 1.16, 1.18; 711/115, 711/173
See application file for complete search history.

(56) References Cited

U.S. PATENT DOCUMENTS

| | | | |
|---|---|---|---|
| 6,034,948 A * | 3/2000 | Nakamura et al. | 370/246 |
| 6,304,948 B1 | 10/2001 | Motoyama et al. | |
| 6,731,447 B2 | 5/2004 | Bunker | |
| 7,111,121 B2 * | 9/2006 | Oishi et al. | 711/115 |
| 2003/0225971 A1 * | 12/2003 | Oishi et al. | 711/115 |
| 2006/0200629 A1 * | 9/2006 | Oishi et al. | 711/115 |

FOREIGN PATENT DOCUMENTS

| | | |
|---|---|---|
| JP | 9-284572 | 10/1997 |
| JP | 2004-7059 | 1/2004 |
| JP | 2004-153516 | 5/2004 |
| WO | WO 2004 111851 | 12/2004 |

OTHER PUBLICATIONS

State Intellectual Property Office of P.R.C., Notification of the First Office Action dated Jun. 22, 2007, for Application No. 2005 10117238.3 filed Oct. 31, 2005.

* cited by examiner

*Primary Examiner*—Gabriel I Garcia
(74) *Attorney, Agent, or Firm*—Patterson & Sheridan, LLP

(57) ABSTRACT

An image processing apparatus selectively sets a feature of securing the confidentiality of real data indicated by allocation data by an enabler attached to the apparatus when the real data left in a storage device are no longer necessary. The image processing apparatus (100) stores in a memory (11) an erasing program for erasing used data in an HDD (19). After executing an image forming process using the data in the HDD 19, if it is detected that an enabler (1) is inserted into an USB interface 20 to lift the restriction on the use of the erasing program, a CPU (10) deletes the allocation data for the unnecessary data and starts the erasing program to overwrite/erase the corresponding real data to secure the confidentiality of the real data. If otherwise, the CPU (10) does not overwrite/erase the real data.

7 Claims, 4 Drawing Sheets

IMAGE PROCESSING APPARATUS AND IMAGE PROCESSING METHOD FOR PROCESSING UNNECESSARY DATA STORED IN STORAGE DEVICE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to an image processing apparatus and so on for processing an image according to data stored in a storage device such as an HDD (hard disk). More particularly, the present invention relates to an image processing apparatus, an image processing program and an image processing method for processing the data of the storage device that are no longer needed.

2. Description of the Related Art

Image processing apparatus having a security feature of erasing the data that are once stored therein for the purpose of prevention of leakage of information are known. For example, a technique of providing a video data erasing unit that is equipped with a means for controlling the number of times of erasing operations to be performed by the video data erasing unit so as to allow a user to arbitrarily select the number of times of erasing the video data to be erased, considering the security level required for each processing mode in which the video data to be erased are output is disclosed in Patent Document 1 (Japanese Patent Application Laid-Open Publication No. 2004-153516).

SUMMARY OF THE INVENTION

However, in recent years, there has been a demand for image processing apparatus to which an enabler can be detachably attachable so as to restrict the use of given features of the apparatus or suspend the restriction so as to improve the convenience of use of the apparatus on the part of the user. Then, on the other hand, the manufacturer of such image processing apparatus can reduce the manufacturing cost with such an arrangement.

With such an arrangement, the user is allowed to use some of the job features of the image processing apparatus including a FAX feature, a scanner feature and/or a printer feature when an enabler is attached to such an image processing apparatus, whereas the use of such job features is restricted when the enabler is not attached to the image processing apparatus.

Additionally, if the features of the enabler are extended to the data processing method of the storage devices such as the HDD of an image processing apparatus to which an enabler is detachably attachable so that the use of the features may be appropriately allowed or restricted, the degree of freedom of the data processing method will be enhanced and the image processing apparatus will become much more convenient for use.

For example, if an image processing apparatus is provided with an overwriting/erasing feature to delete real data, much time is required to erase real data. Then, the user may want to proceed with his or her operation without erasing real data to save time particularly if the real data are not particularly confidential. Then the use of the data processing apparatus will be more convenient if the overwriting/erasing feature is restricted without difficulty.

The present invention is based on the above-described idea and it is an object of the present invention to provide an image processing apparatus, an image processing program and an image processing method with which the user can easily select either the use or the non-use of the feature of erasing or overwriting/erasing data that are no longer necessary.

In an aspect of the present invention, the above object is achieved by providing an image processing apparatus for processing an image according to data stored in a storage device, the apparatus comprising an enabler attachment determining section for determining if an enabler that can be authorized to overwrite/erase data written to the storage device and is detachably attachable to the image processing apparatus is attached to the apparatus, and an unnecessary data processing section for deleting the data and overwriting/erasing the corresponding data region of the storage device when it is determined by the enabler attachment determining section that the enabler is attached and also deleting the data but not overwriting/erasing the corresponding data region of the storage device when it is determined by the enabler attachment determining section that the enabler is not attached when deleting the data written to the storage device.

In another aspect of the present invention, there is provided an image processing program for processing an image according to data stored in a storage device, the program comprising an enabler attachment determining step that determines if an enabler that can be authorized to overwrite/erase data written to the storage device and is detachably attachable to an image processing apparatus is attached to an image forming apparatus, and an unnecessary data processing step that deletes the data and overwriting/erasing the corresponding data region of the storage device when it is determined in the enabler attachment determining step that the enabler is attached and also deleting the data but not overwriting/erasing the corresponding data region of the storage device when it is determined in the enabler attachment determining step that the enabler is not attached when deleting the data written to the storage device.

In still another aspect of the present invention, there is provided an image processing method for processing an image according to data stored in a storage device, the method comprising an enabler attachment determining step that determines if an enabler that can be authorized to overwrite/erase data written to the storage device and is detachably attachable to an image processing apparatus is attached to an image forming apparatus, and an unnecessary data processing step that deletes the data and overwriting/erasing the corresponding data region of the storage device when it is determined in the enabler attachment determining step that the enabler is attached and also deleting the data but not overwriting/erasing the corresponding data region of the storage device when it is determined in the enabler attachment determining step that the enabler is not attached.

Thus, according to the invention as defined above, there are provided an image processing apparatus, an image processing program and an image processing method with which the user can easily select either the use or the non-use of the feature of erasing or overwriting/erasing data that are no longer necessary.

DETAILED DESCRIPTION OF THE INVENTION

Figure 1:
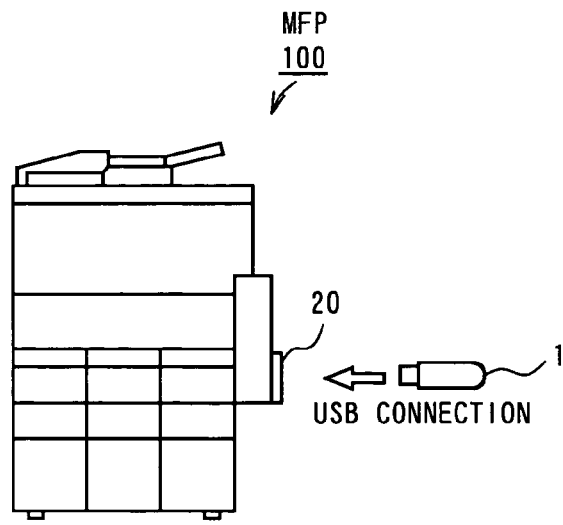
FIG. 1 is a schematic illustration showing how an enabler is used in an embodiment of image processing apparatus according to the invention, which is a digital composite machine, or a multi functional peripheral (MFP).
Figure 2:
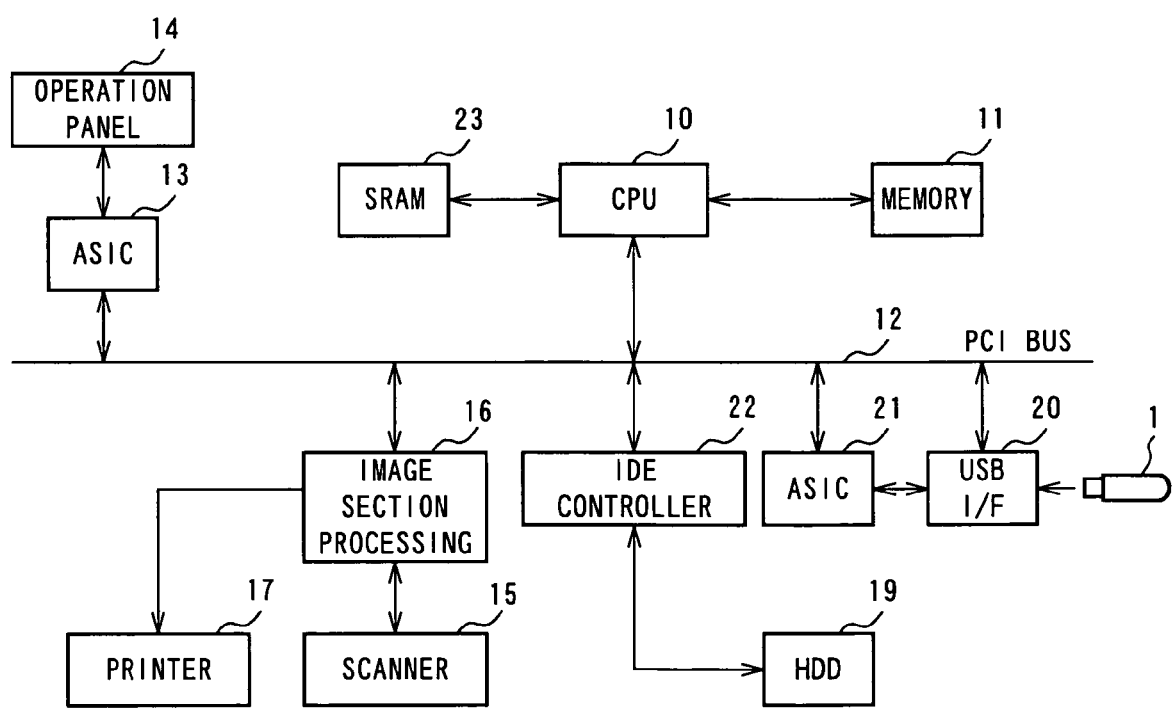
FIG. 2 is a schematic block diagram of the multi functional peripheral of FIG. 1, showing the components thereof.
Figure 3:
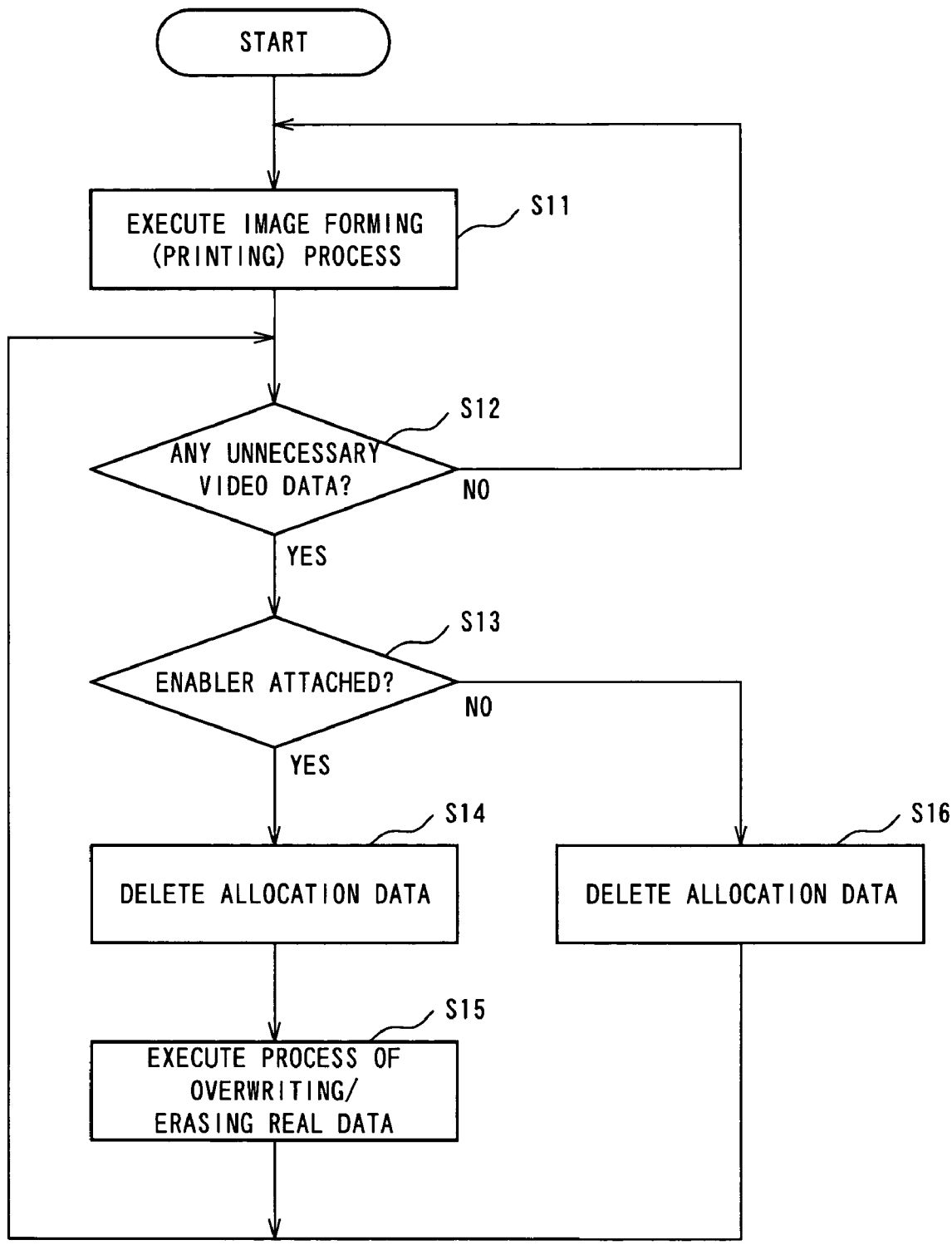
FIG. 3 is a flowchart of an operation of erasing data from the HDD of FIG. 2.
Figure 4:
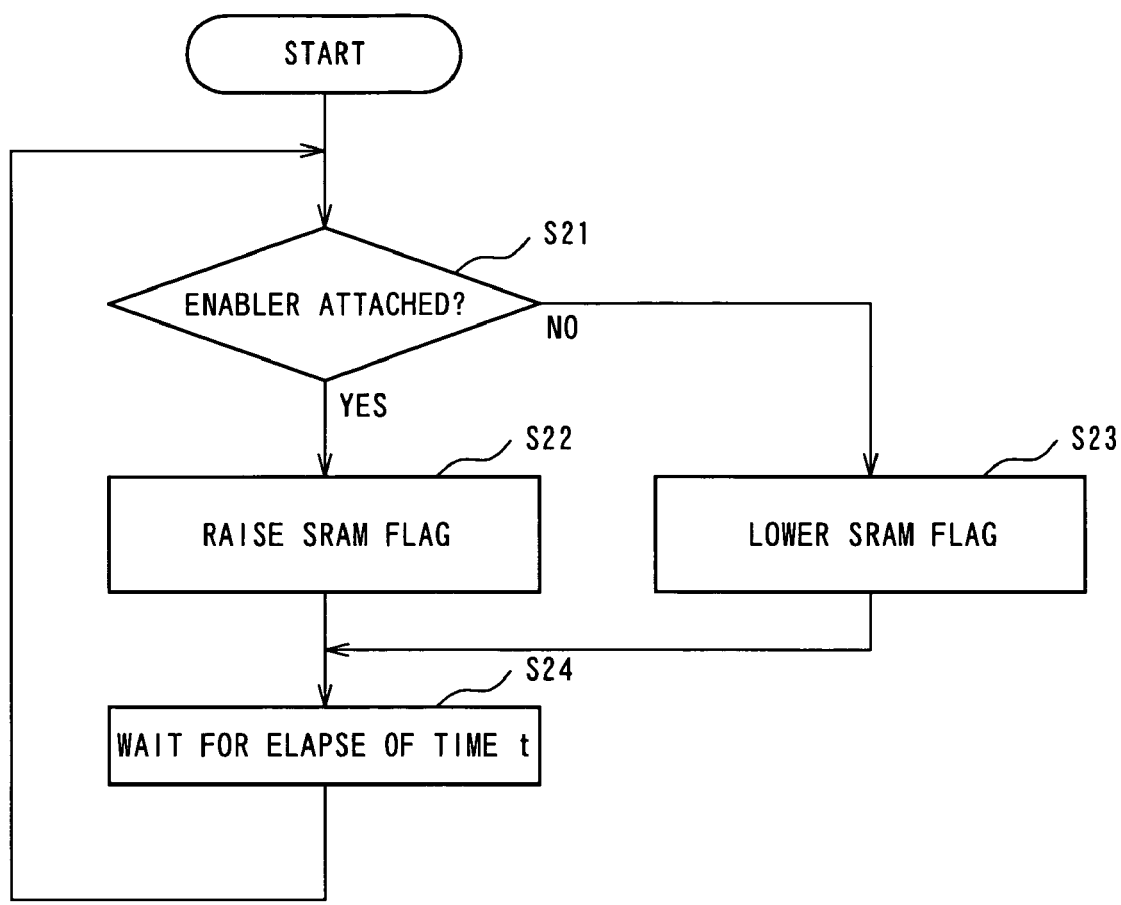
FIG. 4 is a flowchart of an operation of detecting if the enabler shown in FIG. 2 is inserted into or pulled out from the USB interface of the MFP of FIG. 1 or FIG. 2, showing how the detecting operation is conducted.
Figure 5:
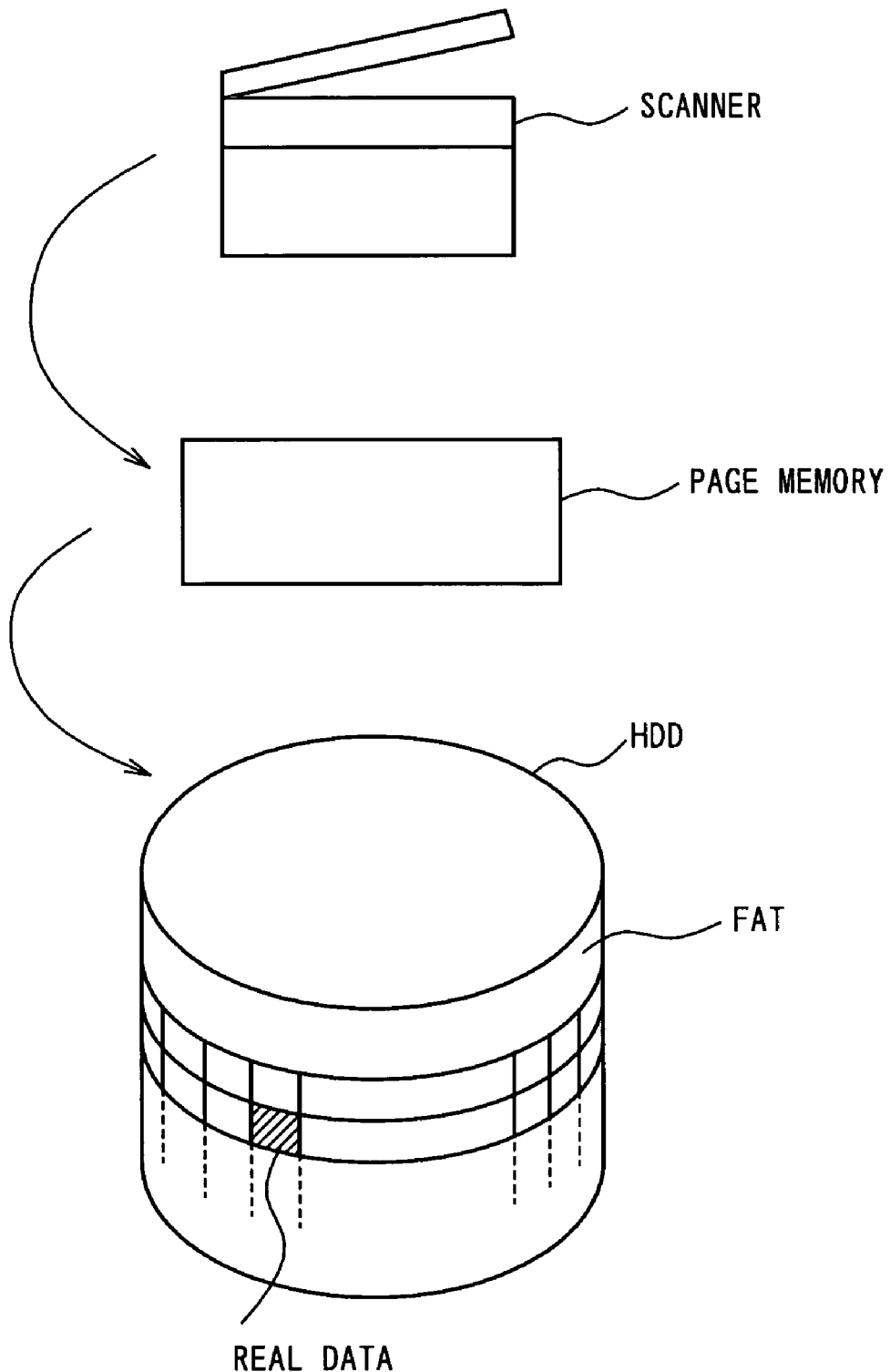
FIG. 5 is a schematic illustration showing how video data are stored in the HDD of FIG. 1.

Now, the present invention will be described in greater detail by referring to the accompanying drawings that illustrate a preferred embodiment of the invention. FIG. 1 is a schematic illustration showing how an enabler is used in an embodiment of image processing apparatus according to the invention, which is a digital composite machine, or a multi functional peripheral (MFP). FIG. 2 is a schematic block diagram of the multi functional peripheral of FIG. 1, showing the components thereof. FIG. 3 is a flowchart of an operation of erasing data from the HDD of FIG. 2. FIG. 4 is a flowchart of an operation of detecting if the enabler shown in FIG. 2 is inserted into or pulled out from the USB interface of the MFP of FIG. 1 or FIG. 2, showing how the detecting operation is conducted. FIG. 5 is a schematic illustration showing how video data are stored in the HDD.

The digital composite machine, or MFP (multi functional peripheral) 100, comprises a CPU 10, a memory 11, a PCI bus 12 (peripheral component interconnected bus), ASICs 13, 21 (application specific integrated circuits), an operation panel 14, a scanner 15, an image processing section 16, a printer 17, an HDD 19, a USB interface 20, an IDE controller 22 and an SRAM 23.

In FIG. 1, reference numeral 1 denotes an enabler adapted to cooperate with the USB interface 20 arranged at the main body of the MFP 100 to form a use of erasing program restricting/restriction lifting apparatus. When the enabler 1 is inserted into the USB interface 20 and held there, it lifts the restriction of the use of the used video data erasing program (to be referred to simply as erasing program hereinafter) that is installed in the MFP. The erasing program is stored in the memory 11 that provides the erasing program storage region and operates according to a command from the CPU 10. The enabler 1 is a hardware key device comprising a flash memory as a principal component thereof, which device can be inserted into and pulled out from the USB interface 20.

The CPU 10 is directly connected to the memory 11 and the SRAM 23 but it is connected to the remaining components by way of the PCI bus 12. The CPU 10 operates as erasure control section and, when it detect the enabler 1 inserted into the USB interface 20, it raises a flag on the SRAM 23 in its management operation. While the CPU 10 controls the components according to the control program stored in the memory 11, the control program includes the erasing program along with an image forming program relating to the functions of the printer feature and those of the scanner.

The erasing program erases the unnecessary video data left in the HDD 19 after an image forming process (printing process) when the conditions as will be described hereinafter are satisfied. The HDD 19 has a first storage region storing a file allocation table (FAT), a second storage region storing video data (real data) to be used for forming images as indicated by the allocation data of the FAT. The erasing program is a program provided to erase real data from the second storage region.

The operation panel 14 to be used for input operations is connected to the PCI bus 12 by way of the ASIC 13, while both the scanner 15 and the printer 17 are connected to the PCI bus 12 by way of the image processing section 16. The HDD 19 is connected to the PCI bus 12 by way of the IDE controller 22. The USB interface 20 is connected to the PCI bus 12 by way of the ASIC 21. Thus, the PCI bus 12 connects the CPU 10, the operation panel 14, the image processing section 16, the HDD 19 and the USB interface 20.

Now, the image forming (printing) process and the erasing operation that is conducted after the image forming process of the MFP 100 having the above described configuration will be described below by referring to FIGS. 3, 4 and 5. Referring to FIG. 3, the CPU 10 controls the image processing section 16 to execute an image forming process (S11). It typically stores the data read by the scanner in a page memory as shown in FIG. 5 and, at the same time, it executes a necessary image forming process on them and stores them in the HDD 19 as image data.

When it stores image data in the HDD 19, it stores them as real data (image data) in the second storage region of the HDD 19 indicated by the allocation data of the FAT in the first storage region of the HDD 19 as shown in FIG. 5. Additionally, the CPU 10 supplies the real data stored in the HDD 19 to the printer 17 by way of the image processing section 16 as image data. The printer 17 prints an image typically on a sheet of printing paper according to the image data supplied from the image processing section 16. Then, the CPU 10 determines if there is any unnecessary video data left in the HDD 19 after the printing operation (S12). If it is detected in Step S12 that there is not any unnecessary data left in the HDD 19, the CPU 10 returns to Step S11. If, on the other hand, it is detected in Step S12 that there is unnecessary data left in the HDD 19, the CPU 10 determines if a flag is raised on the SRAM 23 to indicate that the enabler 1 is attached or not (S13).

The flag that indicates that the enabler 1 is attached or not is managed by the CPU 10 in the steps shown in FIG. 4. More specifically, the CPU 10 determines if the enabler 1 is inserted into (attached to) the USB interface 20 or not (S21). If the enabler 1 is inserted, the CPU 10 raises a flag on the SRAM 23 to indicate that the enabler 1 is inserted (S22) and waits for the elapse of a predetermined period of time t (S24) before it returns to Step S21. If, on the other hand, it is determined in Step S21 that the enabler 1 is not inserted, the CPU 10 holds the SRAM 23 in a state where no flag is raised there (S23) and waits for the elapse of a predetermined period of time t (S24) before it returns to Step S21. Thus, the CPU 10 checks if the enabler 1 is inserted into or pulled out from the USB interface 20 every period of time t.

Referring back to FIG. 3, if it is determined in Step S13 that the enabler 1 is inserted into the USB interface 20 and a flag is raised on the SRAM 23, the CPU 10 deletes the allocation data relating the image data to be erased (S14) and, at the same time, operates the erasing program stored in the memory 11 to overwrite/erase the real data indicated by the allocation data thereof (S15). The CPU 10 returns to Step S12 after the overwriting/erasing operation. If, on the other hand, it is determined in Step S13 that the enabler 1 is not inserted in the USB interface 20 and no flag is raised on the SRAM 23, it deletes the allocation data (S16) in a conventional manner as described above (S16) but it returns to Step S12 without overwriting/erasing the real data.

To summarize the above described operations of the image processing apparatus, the restriction of the use of the erasing program stored in the memory 11 is lifted when the enabler 1 is inserted into the USB interface 20 so that the CPU 10 starts the erasing program stored in the memory 11 for the video data that are used and unnecessary and erases the real data relating to the used video data that are left in the HDD 10 by means of the started erasing program. Otherwise, however, the CPU 10 operates in a conventional manner and typically erases (deletes) only the allocation data.

As may be clear from the above description, it is now possible to set the image processing apparatus in such a way that the enabler 1 is inserted into the USB interface 20 to utilize the erasing program according to the invention for a confidential document (that is not to be leaked to the outside). On the other hand, it is also possible to set the image processing apparatus in such a way that the USB interface 20 is pulled out of the USB interface 20 and the user can proceed with operations at high speed without using the erasing program according to the invention in order to utilize any of the conventional features. In short, the erasing feature can be selectively used.

With this embodiment, it is possible to provide an image processing program for causing the computer of the image processing apparatus to execute the steps shown in FIGS. 3 and 4.

As described above in detail, with this embodiment of the present invention, a used video data erasing program for overwriting/erasing the real data indicated by the allocation data stored in the HDD is stored in advance in the erasing program storage region and, when an image forming process is executed by using the real data indicated by the allocation data, the erasing control section starts the used video data erasing program for the unnecessary data that are used for the image forming process and deletes the corresponding allocation data and, at the same time, overwrite/erase the real data indicated by the allocation data when it detects that the restriction of the use of the used video data erasing program is lifted by the enabler (use of erasing program restricting/restriction lifting apparatus). If, on the other hand, the restriction of the use of the used video data erasing program is not lifted, the image processing operation operates in a conventional manner and does not execute a process of erasing real data that requires vast operation time.

Thus, with the above-described arrangement, it is now possible to completely erase data including real data that are highly confidential but execute related processes in a conventional manner for data that are not highly confidential to save processing time. In short, it is possible to selectively use an appropriate processing method to meet various requests efficiently. While the SRAM 23 is used to raise a flag in the above described embodiment, the memory 11 or a register may alternatively be used for raising a flag.

While the present invention is described above by way of specific embodiments, the present invention is by no means limited to the above embodiments, which may be modified, altered and/or combined in various different ways to provide advantages without departing from the spirit and scope of the invention.

For example, while the above-described program is stored in the memory in the apparatus that operates as recording medium, the program may alternatively be downloaded to the apparatus from a network. Still alternatively, a recording medium storing a similar feature may be installed in the apparatus. Recording mediums that can be used for the purpose of the present invention include CD-ROMs that can store programs if the apparatus can read the program for such a storage medium. Still alternatively, the features that can be acquired by installing or downloading in advance may be realized as a result of cooperation with the OS (operating system) in the inside of the apparatus.

The invention claimed is:

1. An image processing apparatus for processing an image according to data stored in a storage device, the image processing apparatus comprising:
    an enabler attachment determining section that determines if an enabler that provides authorization to overwrite/erase data written to the storage device and is detachably attachable to the image processing apparatus is attached to the image processing apparatus; and
    an unnecessary data processing section that deletes the data and overwrites/erases the corresponding data region of the storage device if it is determined by the enabler attachment determining section that the enabler is attached to the image processing apparatus, and deletes the data but does not overwrite/erase the corresponding data region of the storage device if it is determined by the enabler attachment determining section that the enabler is not attached to the image processing apparatus.

2. The image processing apparatus according to claim 1, wherein
    the storage device has a first storage region for storing allocation data and a second storage region for storing real data indicated by the allocation data; and
    the unnecessary data processing section is adapted to delete the allocation data in the first storage region and, at the same time, overwrite/erase the real data in the second storage region if it is determined by the enabler attachment determining section that the enabler is attached to the image processing apparatus but delete only the allocation data in the first storage region and not overwrite/erase the real data in the second storage region if it is determined by the enabler attachment determining section that the enabler is not attached to the image processing apparatus.

3. The image processing apparatus according to claim 1, wherein
    the enabler comprises a key device adapted to be inserted into and pulled out from a USB interface arranged at a side of a main body of the image processing apparatus so as to provide the USB interface with usage restriction lifting data that allow the restriction on erasing the real data to be lifted.

4. A computer readable storage medium storing an image processing program for processing an image according to data stored in a storage device, the image processing program, which when executed in an image forming apparatus, causes the image forming apparatus to carry out a method comprising:
    an enabler attachment determining step that determines if an enabler that provides authorization to overwrite/erase data written to the storage device and is detachably attachable to an image processing apparatus is attached to the image forming apparatus; and
    an unnecessary data processing step that deletes the data and overwrites/erases the corresponding data region of the storage device if it is determined in the enabler attachment determining step that the enabler is attached to the image processing apparatus, and deletes the data but does not overwrite/erase the corresponding data region of the storage device if it is determined in the enabler attachment determining step that the enabler is not attached to the image processing apparatus.

5. The image processing program according to claim 4, wherein the storage device has a first storage region for storing allocation data and a second storage region for storing real data indicated by the allocation data; and the unnecessary data processing step is adapted to delete the allocation data in the first storage region and, at the same time, overwrite/erase the real data in the second storage region if it is determined by the enabler attachment determining step that the enabler is attached to the image processing apparatus but delete only the allocation data in the first storage region and not overwrite/erase the real data in the second storage region if it is determined by the enabler attachment determining step that the enabler is not attached to the image processing apparatus.

6. An image processing method for processing an image according to data stored in a storage device, the image processing method comprising:

an enabler attachment determining step that determines if an enabler that provides authorization to overwrite/erase data written to the storage device and is detachably attachable to an image processing apparatus is attached to an image forming apparatus; and an unnecessary data processing step that deletes the data and overwrites/erases the corresponding data region of the storage device if it is determined in the enabler attachment determining step that the enabler is attached to the image processing apparatus, and deletes the data but does not overwrite/erase the corresponding data region of the storage device if it is determined in the enabler attachment determining step that the enabler is not attached to the image processing apparatus.

7. The image processing method according to claim 6, wherein the storage device has a first storage region for storing allocation data and a second storage region for storing real data indicated by the allocation data; and the unnecessary data processing step is adapted to delete the allocation data in the first storage region and, at the same time, overwrite/erase the real data in the second storage region if it is determined by the enabler attachment determining section that the enabler is attached to the image processing apparatus but delete only the allocation data in the first storage region and not overwrite/erase the real data in the second storage region if it is determined by the enabler attachment determining section that the enabler is not attached to the image processing apparatus.

* * * * *